Figure 1:
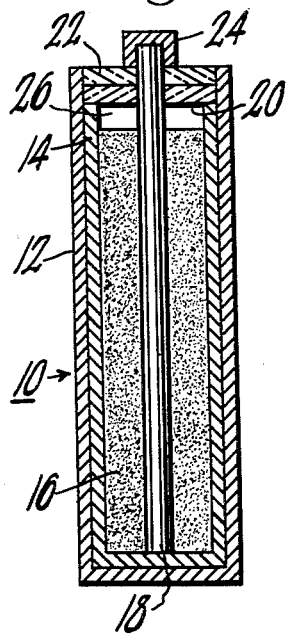

May 27, 1958  C. K. MOREHOUSE ET AL  2,836,644
PRIMARY CELLS
Filed June 13, 1956

INVENTORS
Clarence K. Morehouse
& Richard Glicksman
BY
ATTORNEY

United States Patent Office 2,836,644
Patented May 27, 1958

---

2,836,644

PRIMARY CELLS

Clarence K. Morehouse, Princeton, and Richard Glicksman, Highland Park, N. J., assignors to Radio Corporation of America, a corporation of Delaware Application June 13, 1956, Serial No. 591,122

15 Claims. (Cl. 136—137)

This invention relates to primary cells, and particularly, but not necessarily exclusively, to improved primary cells including a magnesium anode and a cathode comprising an azo organic compound.

Primary cells are electrochemical devices from which stored chemical energy is converted directly into electrical energy by an electrochemical process. Generally, the term primary cells refers to a class of cells that do not have efficiently reversible chemical reactions. Once the chemical energy is converted to electrical energy, the cells are discarded. Primary cells that are manufactured to include a non-spillable electrolyte are referred to as dry cells. Primary cells that are assembled without one of the essential components, such as the electrolyte, but are adapted to supply electrical energy when the component is added just prior to use, are referred to as reserve cells.

A primary cell which is to be used as a portable power supply should have the following characteristics: a high watt-hour and a high ampere-hour capacity per unit of volume or weight; a high, flat operating voltage over a wide range of current drains; a long life; and a low cost.

One problem in present day primary cells is that they include materials which come into short supply in times of emergency because the materials become critical to the interests of the United States as a whole. These materials may become critical because they are supplied from foreign sources or because domestic ore sources are limited in size and mining capacity, or for some other economic reason.

Accordingly, an object of this invention is to provide primary cells which are comparatively inexpensive to manufacture, have a high watt-hour and a high ampere-hour capacity per unit of volume or weight, and have a relatively high, flat operating voltage level over a wide range of current drains.

A further object is to provide an improved electrochemical system for primary cells.

Another object is to provide improved primary cells including materials which are non-strategic, can be readily available in large quantities in the United States, and are comparatively inexpensive.

In general, the foregoing objects are accomplished in the improved primary cells of the invention which include an anode selected from the group consisting of magnesium and magnesium base alloys and a cathode including an organic oxidizing substance in which the oxidizing properties are due at least in part to azo groups chemically combined in said substance. The invention includes reserve cells including the foregoing combination and adapted to be used to supply electrical energy upon the addition of an electrolyte.

Figure 2:
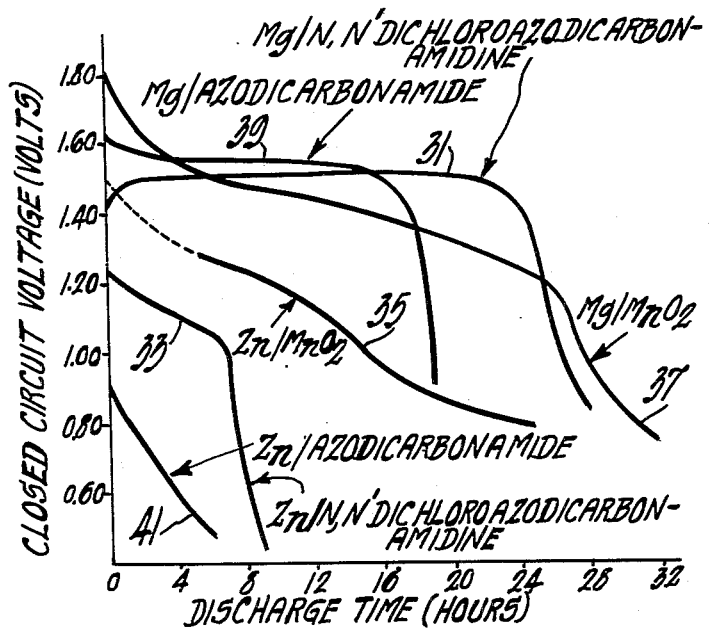
Figure 3:
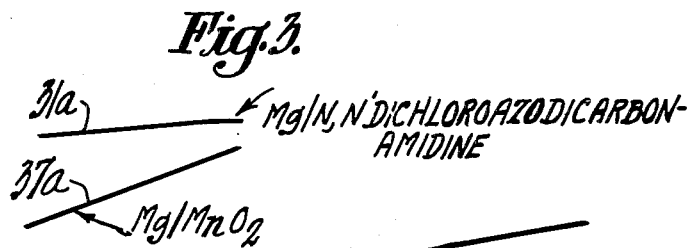

The invention is described in greater detail by reference to the drawing wherein:

Figure 1 is a sectional, elevational view of a typical dry cell of the invention, Figure 2 is a family of curves showing the change in cell voltage with respect to discharge time of an "AA" size dry cell of the invention compared with comparable dry cells from other electrochemical systems when discharged continuously through a 50 ohm resistance, and Figure 3 is a set of curves illustrating the relative amount of electric power delivered by the cells of Figure 2 for various load resistances.

*Example 1.*—Referring to Figure 1, a dry cell according to the invention may be prepared as follows. A metallic anode 12 is provided in the form of a cup of the standard "AA" size (American Standards Association, Bureau of Standards, Washington, D. C.). The anode 12 has the approximate composition 98.4% magnesium, 1.0% aluminum, 0.5% zinc and 0.1% calcium. This alloy is sometimes designated AZ10A. The anode 12 is lined with a separator 14 comprising an absorbent kraft paper. The separator 14 keeps the anode 12 and a cathode 16 apart while providing therebetween a low resistance path to the flow of ions during the electrochemical process.

A mix including the cathode material and electrolyte, hereinafter referred to as the cathode mix, is prepared of the following constituents:

30 grams N,N' dichloroazodicarbonamidine
15 grams acetylene black
1.3 grams barium chromate
60 ml. distilled water Approximately 5 grams of the cathode mix is formed to a cylindrical slug and inserted into the paper lined anode 12 to form a cathode 16. A carbon rod 18 is inserted into the cathode mix 16 to provide electrical connection thereto. The anode 12 is sealed by an insulating washer 20 mounted on the carbon rod and a layer 22 of hard wax on the washer. A metal contact cap 24 of brass is placed on rod 18. An air space 26 is provided between the washer 20 and the cathode 16.

The anode and cathode may now be connected through an external load whereby the cell commences to be discharged by electrochemical action. The cell reactions are believed to occur as follows:

*Overall reaction*

$$3Mg \longrightarrow 3Mg^{++} + 6e^-$$

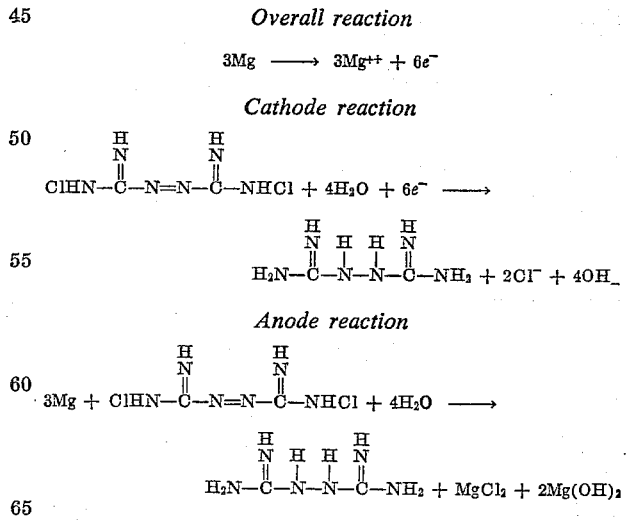

Figure 2 shows characteristic initial discharge curves for "AA" size dry cells discharged continuously through a 50 ohm load resistance (simulating the current drain requirements of a transistor operated portable radio).

Curve 31 shows the characteristic discharge curve for a cell prepared according to Example 1 comprising a cathode including N,N' dichloroazodicarbonamidine and a magnesium anode (magnesium/N,N' dichloroazodicarbonamidine). Curve 33 shows the discharge curve for a similar zinc/N,N' dichloroazodicarbonamidine cell discharged under the same conditions. For comparison, curve 35 shows the characteristic discharge curve for a similar commercially-available zinc/manganese dioxide dry cell discharged under the same conditions. Curve 37 shows the characteristic discharge curve for a similar magnesium/manganese dioxide cell discharged under the same conditions. The dry cell of Example 1 exhibits a flatter voltage curve than prior cells resulting in more uniform performance of the equipment which is supplied with electric power. Also, the dry cell of Example 1 supplies electric power for a relatively long period of time to a 0.9 volt cutoff. This cutoff voltage represents the practical voltage below which portable electronic equipment ordinarily becomes inoperative when supplied with battery power.

Figure 3 compares several dry cells of Figure 2 for watt-minutes per gram of cell to a 0.9 volt cutoff for various load resistances. The dry cell of Example 1 provides more total power per unit of weight than any of the other cells over the entire range of discharge rates shown. Figures 2 and 3 show that the dry cell of Example 1 is lighter and provides a more uniform voltage over a relatively long period of time per unit of weight. The practical advantage is that portable electronic equipment may be operated more uniformly for long periods of time with lighter cells. For example, in missiles for military use where weight is an important factor, the dry cell of Example 1 is lighter than prior cells at a similar power output and, in addition, delivers power at a more uniform voltage level.

In addition to its favorable performance, the dry cell of Example 1 has the great advantage that it employs non-strategic, plentiful materials which are relatively easy to manufacture in the United States, and when manufactured in large quantities, should be relatively inexpensive. Magnesium may be obtained from sea water and the N,N' dichloroazodicarbonamidine may be produced synthetically.

The primary cells of the invention comprise generally the following parts:

(1) An anode selected from the group of materials consisting of magnesium and magnesium-base alloys, (2) An electrolyte which may include (a) a soluble substance for increasing the electrical-conductivity thereof and (b) a material for inhibiting the corrosion of the anode, (3) A cathode including a depolarizer consisting of an organic oxidizing substance in which the oxidizing properties thereof are due at least in part to chemically combined azo groups. The cathode may include also an inorganic depolarizer, other organic depolarizer and/or an inorganic material for increasing the conductivity of the cathode.

*The Anode.*—The anode for the primary cells of the invention may be magnesium or magnesium-base alloys. The term "magnesium anode" will hereinafter be used to include both magnesium and magnesium base alloy anodes. A magnesium-base alloy is one wherein the predominant ingredient is magnesium. Thus, any alloy having more than 50% magnesium is satisfactory. It is preferred, however, to have as high a proportion of magnesium as possible. Other ingredients are added to magnesium to improve the properties of the anode for fabrication purposes, to impart a greater degree of corrosion resistance, or for other reasons. Table I sets forth examples of magnesium-base alloys which are suitable for anode material together with the corresponding ASTM designations.

TABLE I

*Anode compositions*

| Alloy No. | A.S.T.M. Designation | Nominal Composition [1] | | | | | |
|---|---|---|---|---|---|---|---|
| | | Al | Mn | Zn | Zr | Ce | Ca |
| 1 | A3 | 3.0 | 0.2 | | | | |
| 2 | A4 | 4.0 | 0.2 | | | | |
| 3 | A8 | 8.0 | 0.1 | | | | |
| 4 | A10 | 10.0 | 0.1 | | | | |
| 5 | A12 | 12.0 | 0.1 | | | | |
| 5a | AZ10A | 1.0 | | 0.5 | | | 0.1 |
| 6 | AZ31 | 2.8 | 0.3 | 1.0 | | | |
| 6a | AZ31X | 3.0 | 0.2 | 1.0 | | | 0.15 |
| 7 | AZ33 | 3.0 | 0.2 | 3.0 | | | |
| 8 | AZ61 | 6.5 | 0.2 | 0.7 | | | |
| 9 | AZ63 | 6.0 | 0.2 | 3.0 | | | |
| 10 | AZ81 | 8.5 | 0.2 | 0.5 | | | |
| 11 | AZ91 | 9.0 | 0.2 | 0.6 | | | |
| 12 | AZ92 | 9.0 | 0.1 | 2.0 | | | |
| 13 | E6 | | | | | 6.0 | |
| 14 | EM42 | | 2.0 | | | 4.0 | |
| 15 | EM62 | | 2.0 | | | 6.0 | |
| 16 | M1 | | 1.5 | | | | |
| 17 | M2 | | 2.0 | | | | |
| 18 | ZK30 | | | 3.0 | 0.7 | | |
| 19 | ZK60 | | | 6.0 | 0.7 | | |
| 20 | Z1 | | | 1.0 | | | |

[1] Balance commercial magnesium.

The magnesium anode may be the container for the cell, or may be the lining of the container, or may be a separate structure inserted in the container. The magnesium anode may be in any geometrical configuration desired.

In Example 1, a paper separator lined the magnesium anode cup 12. It is necessary to space the cathode and anode from one another. To accomplish this, it is preferred to insert a separator between the anode and the cathode regardless of configuration, although other methods of spacing may be used. The separator may be any porous material such as kraft paper, kraft paper treated with a gel-like material such as carboxymethyl cellulose, polyvinyl alcohol, or a starch-flour gel. The coating on the kraft paper promotes adhesion of the paper to the anode and maintains good electrical contacts between the electrolyte and the anode. Porous ceramics or other inorganic or organic structures may be used in place of paper.

*The electrolyte.*—The electrolyte may be an aqueous solution containing a soluble salt such as sea water, or water to which one or more soluble salts have been deliberately added. Bromides of alkali metals, alkaline earth metals, and ammonium cations are the preferred soluble salts in the electrolyte. The electrolyte may be prepared by dissolving the salt in water in a concentration between about 30 grams per liter of water and that producing a saturated solution at ordinary temperatures. The concentration does not appear to be critical, although for best results certain concentrations are to be preferred depending upon the particular salt or combination of salts that are used. For example, preferred concentrations of the alkaline earth metal bromides (hydrated) are from about 150 to 600 grams, preferably 500 grams, of the salt per liter of water. While a single salt may be used as the electrolyte, combinations of salts, particularly combinations of alkali metal bromides with alkaline earth metal bromides are desirable. Examples of soluble salts that may be added to the electrolyte are lithium bromide, sodium bromide, magnesium bromide, magnesium chloride, strontium bromide, calcium bromide, and ammonium bromide.

It is also desirable to include in the electrolyte one or more alkali metal, alkaline earth metal (including magnesium), or ammonium salts of chromic acid in corrosion-inhibiting amounts. The chromic acid salts may be used in proportions between 0.01 gram per liter of solution to concentrations producing saturation in the presence of the electrolyte salt obtained therein. A preferred concentration of lithium chromate is about 0.05 to 2.0 grams per liter of solution. Examples of corrosion-inhibiting salts are sodium chromate, ammonium chromate, potassium dichromate, lithium dichromate, magnesium chromate, calcium chromate.

For certain applications, principally where a long shelf life is required, it is desirable to omit one of the essential components until the need for electrical energy has arisen. The primary cells of the invention are particularly adaptable to be prepared as reserve cells.

*The cathode.*—The cathode includes a depolarizer consisting of an organic oxidizing substance in which the oxidizing properties are due at least in part to azo groups chemically combined in said substance. These substances are also referred to as azo organic compounds. During the electrochemical action, the substance undergoes a reduction as the primary cell furnishes electric current. The azo organic compounds which are insoluble in conventional electrolytes are particularly suitable for use as cathode materials in dry cells. Azo organic compounds soluble in the cell electrolyte may be used in reserve cells.

The following list includes some of the azo organic compounds which are useful in preparing primary cells according to the invention. The members of the list are intended as examples only.

N,N' dichloroazodicarbonamidine
N,N' dibromoazodicarbonamidine
Azodicarbonamide and acid salts thereof such as:
    azodicarbonamide nitrate and
    azodicarbonamide sulfate
Azoformic acid and inorganic salts thereof such as:
    sodium azoformate and
    potassium azoformate
Alkyl and aryl ester of azoformic acid such as:
    ethyl azoformate,
    methylazoformate,
    phenylazoformate and
    isobutylazoformate
Nitro alkyl and aryl esters of azoformic acid such as:
    2-chloro-2-nitropropyl azoformate,
    3,3' dinitrobutylazoformate and
    2,4 dinitrophenylazoformate Any azo organic compound may be used in the cathodes of the primary cells of the invention. The primary cells of the invention all utilize the electron change obtained by converting a double bonded nitrogen to a single bonded nitrogen. This is shown schematically by the following equation:

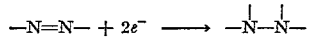

Under more vigorous conditions, it may be possible to obtain further reduction.

In addition, such compounds may have other radicals in their structure which alter their physical and chemical properties to affect the stability and solubility in the electrolyte. It is also recognized that by changing the structure of the azo organic compounds, the theoretical capacity, shelf life and the rate at which electric energy can be withdrawn from the cell can be altered. The selection of the particular compound and its structure will depend on the application for which the particular primary cell is intended. The utility of the azo organic compounds may be further enhanced by the presence of oxidizing radicals such as nitro groups, positive halogen groups, etc. which increase the theoretical capacity. The cathodes of the primary cells of the invention may also comprise a mixture of one or more azo organic compounds, or a mixture with one or more other organic oxidizing compounds such as a nitro organic compound, or with inorganic cathode materials such as manganese dioxide.

For many situations, it is desirable to increase the electrical conductivity of the cathode. One may add varying proportions of non-reactive conductive materials to obtain the desired electrical conductivity. Carbon is a preferred material for this purpose because of its low cost and easy availability. Any of the various forms of carbon, such as graphite or acetylene black, may be used. The conducting material may comprise up to 80% by weight of the cathode mix.

The cathodes of the invention may be fabricated by a number of methods and in various shapes. Example 1 describes preparing a mixture of powders with electrolyte and then pressing a quantity of the mixture to the desired shape and density. Another cathode mix may include a binder such as polyvinyl alcohol, carboxymethylcellulose, methylcellulose, a vinyl resin, bentonite or silica gel. Such mix may be pressed as described above, or cast in a mold to fabricate the cathode. The binder adds strength and rigidity to the cathode especially where odd shapes are used. A cathode mix containing a binder may be coated on a suitable support, such as a carbon rod or block and used in layer form. Besides simple coatings, films containing the cathode mix may also be prepared by the addition of a film-forming material to the cathode mix and using techniques well-known in the plastics art. One technique is to coat paper separator sheets with magnesium powder in a binder on one surface and the cathode mix in a binder on the other surface. The coated sheets may then be stacked and stamped to produce batteries of the desired voltage and geometry.

In some cases, it is desirable to increase the amount of active surface on the cathode. One method for increasing the active surface is to add a proportion of a soluble material, such as sodium chloride, to the cathode mix before fabrication. Upon fabrication, the soluble material is dissolved out of the cathode leaving a somewhat porous structure with a greatly increased proportion of active surface.

The presence of atmospheric oxygen enhances the capacity of the cathodes of cells of various kinds. Capacity increases can be realized in the cells of Example 1, for example, by providing a small vent (e. g. 0.05" in diameter) in the wax layer 22 or by preparing a tab on the washer 20 which tab extends up through the wax layer 22. The maximum effect is ordinarily obtained when the drain is relatively light.

It is noteworthy that the materials used to fabricate the cells of the invention may all be produced in the United States by processes well known in the chemical arts. Magnesium may be produced from sea water which is in abundant supply in the United States. Azo organic compounds may be produced synthetically in the United States. Graphite and acetylene black are also available from sources within the United States.

*Example 2.*—Another dry cell according to the invention may be prepared according to Example 1 except that the cathode mix has the following formulation:

40 grams azodicarbonamide
20 grams acetylene black
1.8 grams barium chromate
60 ml. aqueous solution containing 500 grams of MgBr$_2$.6H$_2$O and 1.0 gram of Li$_2$Cr$_2$O$_4$.2H$_2$O per liter of water The discharge curve of this cell continuously discharged through a 50 ohm resistance is shown in Figure 2, curve 39. This cell also has a high flat discharge curve and a high watt-hour capacity per unit of weight and volume. The characteristic discharge curve for a similar Zn/azodicarbonamide cell under similar conditions is shown by curve 41 of Figure 2.

*Example 3.*—Another dry cell according to the invention may be prepared according to Example 1 except that the cathode mix has the following formulation:

15 grams N,N'-dichloroazodicarbonamidine
15 grams p-nitrosodimethylaniline
15 grams acetylene black
1.35 grams BaCrO$_4$
65 ml. aqueous solution containing 500 grams MgBr$_2$.6H$_2$O and 1.0 gram Li$_2$CrO$_4$.2H$_2$O per liter of water

*Example 4.*—Another dry cell according to the invention may be prepared according to Example 1 except that the cathode mix has the following formulation:

15 grams azodicarbonamide
15 grams acetylene black
15 grams African manganese dioxide
1.35 grams BaCrO$_4$
77 ml. aqueous solution containing 500 grams MgBr$_2$.6H$_2$O and 1.0 gram Li$_2$CrO$_4$.2H$_2$O per liter of water

*Example 5.*—Another dry cell according to the invention may be prepared according to Example 1 except that the cathode mix has the following formulation:

30 grams ethyl ester of azoformic acid
15 grams acetylene black
1.35 grams BaCrO$_4$
60 ml. aqueous solution containing 500 grams MgBr$_2$.6H$_2$O and 1.0 gram Li$_2$CrO$_4$.2H$_2$O

*Example 6.*—Another dry cell according to the invention may be prepared according to Example 1 except that the cathode mix has the following formulation:

30 grams azoformic acid
15 grams acetylene black
1.35 grams BaCrO$_4$
60 ml. aqueous solution containing 500 grams MgBr$_2$.6H$_2$O and 1.0 gram Li$_2$CrO$_4$.2H$_2$O per liter of water

*Example 7.*—Another dry cell according to the invention may be prepared according to Example 1 except that the cathode mix has the following formulation:

30 grams 2-chloro-2-nitropropyl ester of azoformic acid
15 grams acetylene black
1.35 grams BaCrO$_4$
60 ml. aqueous solution containing 500 grams MgBr$_2$.6H$_2$O and 1.0 gram Li$_2$CrO$_4$.2H$_2$O per liter of water

*Example 8.*—Another dry cell according to the invention may be prepared according to Example 1 except that the cathode mix has the following formulation:

30 grams azodicarbonamidine nitrate
15 grams BaCrO$_4$
60 ml. aqueous solution containing 500 grams MgBr$_2$.6H$_2$O and 1.0 gram Li$_2$CrO$_4$.2H$_2$O per liter of water

*Example 9.*—A reverse cell according to the invention may be prepared by formulating the following cathode mix:

20 grams N,N' dichloroazodicarbonamidine
10 grams acetylene black
40 ml. solution containing 5% by weight of cellulose acetate in acetone Paste a quantity of the cathode mix to a graphite plate about 1.25" x 1.00" x 0.0625" thick and weighing about 2 grams. The cathode is dried and then wrapped with a piece of salt free kraft paper and then wrapped with a magnesium sheet about 3.0" x 1.0" x 0.010" thick and weighing about 1.0 gram. When ready to be used as a primary cell, the assembly is immersed in an aqueous solution containing 500 grams MgBr$_2$.6H$_2$O and 1.00 Li$_2$CrO$_4$.2H$_2$O per liter of water.

There have been described an improved electrochemical system which may be employed in primary cells. There have also been described improved primary cells, both dry and reserve, which are inexpensive to manufacture, which exhibit a high watt-hour and a high ampere-hour capacity per unit of volume or weight, and a relatively high flat operating voltage level over a wide range of current drains. The primary cells of the invention comprise materials which are non-strategic and can be readily available in large quantities in the United States.

What is claimed is:

1. In a primary cell, an anode selected from the group consisting of magnesium and magnesium base alloys in combination with a cathode including a depolarizer consisting of an organic oxidizing compound in which the oxidizing properties of said compound are due at least in part to aliphatic azo groups chemically combined in said compound.

2. A primary cell according to claim 1 wherein said anode comprises a magnesium base alloy.

3. A primary cell according to claim 1 wherein said cathode comprises a mixture of different organic oxidizing compounds in which the oxidizing properties of at least one of said compounds are due at least in part to aliphatic azo groups chemically combined in said compounds.

4. A primary cell according to claim 1 wherein said cathode includes an inorganic depolarizer.

5. A primary cell according to claim 1 wherein said cathode includes an inorganic material for increasing the electrical conductivity of said cathode.

6. A primary cell comprising a magnesium anode, an electrolyte, and a cathode including a depolarizer consisting of an organic oxidizing compound in which the oxidizing properties are due at least in part to aliphatic azo groups chemically combined with said compound.

7. A primary cell according to claim 6 wherein said electrolyte is an aqueous solution having dissolved therein a substance selected from the group consisting of alkali metal bromides, alkaline earth metal bromides, and ammonium bromides.

8. A primary cell according to claim 6 wherein said electrolyte is an aqueous solution having dissolved therein a chromic acid salt of an anion selected from the group consisting of alkali bases, alkaline earth metal bases and ammonium bases.

9. A primary cell comprising a magnesium base alloy anode, an aqueous electrolyte having dissolved therein magnesium bromide and a chromate inhibitor, and a cathode comprising carbon and an organic oxidizing compound in which the oxidizing properties are due at least in part to aliphatic azo groups chemically combined in said compound.

10. A primary cell including a magnesium anode, an aqueous electrolyte, and a cathode including N,N' dichloroazodicarbonamidine.

11. A primary cell including a magnesium anode, an aqueous electrolyte, and a cathode including azodicarbonamide.

12. A primary cell including a magnesium anode, an aqueous electrolyte, and a cathode including azoformic acid.

13. A primary cell including a magnesium anode, an aqueous electrolyte, and a cathode including 2-chloro-2-nitropropylazoformate.

14. A primary cell including a magnesium anode, an aqueous electrolyte, and a cathode including azodicarbonamide nitrate.

15. A reserve cell adapted to be used upon the addition of an electrolyte, said cell comprising a magnesium anode and associated therewith, a cathode comprising a depolarizer consisting of an organic oxidizing compound in which the oxidizing properties are due at least in part to aliphatic azo groups chemically combined in said compound.

References Cited in the file of this patent

UNITED STATES PATENTS

| 2,016,257 | Schmelkes et al. | Oct. 1, 1935 |
| 2,471,959 | Hunt | May 31, 1949 |
| 2,612,533 | Blake | Sept. 30, 1952 |
| 2,713,576 | Benneville | July 19, 1955 |

OTHER REFERENCES

Glasstone, S. and Hickling, A.: Electrolytic Oxidation and Reduction, D. Van Nostrand Co., New York, 1936, page 206.

UNITED STATES PATENT OFFICE
CERTIFICATE OF CORRECTION

Patent No. 2,836,644                                               May 27, 1958

Clarence K. Morehouse et al.

It is hereby certified that error appears in the printed specification of the above numbered patent requiring correction and that the said Letters Patent should read as corrected below.

Column 2, line 45, for "Overall" read -- Anode --; line 55, for +4OH_" read -- +4OH⁻ --; line 57, for "Anode" read -- Overall --.

Signed and sealed this 22nd day of July 1958.

(SEAL)
Attest:

KARL H. AXLINE                                        ROBERT C. WATSON
Attesting Officer                                     Commissioner of Patents